(12) United States Patent
Larkin et al.

(10) Patent No.: US 7,454,894 B2
(45) Date of Patent: Nov. 25, 2008

(54) SUPPLEMENTAL OIL COOLER AIRFLOW FOR GAS TURBINE ENGINE

(75) Inventors: Michael J. Larkin, Rocky Hill, CT (US); Donald C. Eiler, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 506 days.

(21) Appl. No.: 11/006,306

(22) Filed: Dec. 7, 2004

(65) Prior Publication Data

US 2006/0117734 A1 Jun. 8, 2006

(51) Int. Cl.
*F02C 7/06* (2006.01)
*F02K 3/06* (2006.01)

(52) U.S. Cl. .................. 60/226.1; 60/39.08
(58) Field of Classification Search .......... 60/806, 60/39.08, 226.1, 266, 785, 782
See application file for complete search history.

(56) References Cited

U.S. PATENT DOCUMENTS

| | | | | |
|---|---|---|---|---|
| 2,625,009 A | * | 1/1953 | Leggett et al. ............ 60/785 |
| 4,397,148 A | * | 8/1983 | Stockton et al. ............ 60/223 |
| 4,546,605 A | * | 10/1985 | Mortimer et al. ........... 60/226.1 |
| 4,782,658 A | * | 11/1988 | Perry ........................ 60/226.1 |
| 5,038,560 A | * | 8/1991 | Seed ......................... 60/226.1 |
| 5,269,135 A | * | 12/1993 | Vermejan et al. .......... 60/226.1 |
| 5,553,449 A | * | 9/1996 | Rodgers et al. ............. 60/204 |
| 5,987,877 A | * | 11/1999 | Steiner ...................... 60/39.08 |
| 6,282,881 B1 | * | 9/2001 | Beutin et al. ............... 60/39.08 |
| 6,931,834 B2 | * | 8/2005 | Jones ......................... 60/226.1 |

* cited by examiner

*Primary Examiner*—Ted Kim
(74) *Attorney, Agent, or Firm*—Carlson, Gaskey & Olds, PC

(57) ABSTRACT

A gas turbine engine is provided with an oil cooler which receives cooling air from a turbo fan. At times when the turbo fan is operating at lower speeds, the volume of cooling air is also lowered. At such times, a supplemental airflow is provided over heat exchangers in the oil cooler. The supplemental airflow includes a supplemental airflow fan and valve for selectively controlling the supplemental airflow over the heat exchangers.

16 Claims, 3 Drawing Sheets

US 7,454,894 B2

SUPPLEMENTAL OIL COOLER AIRFLOW FOR GAS TURBINE ENGINE

BACKGROUND OF THE INVENTION

This application relates to a supplemental airflow passing over an oil cooler that typically receives air from a turbo fan in a gas turbine engine, with the supplemental airflow being actuated at times of low airflow from the turbo fan.

Gas turbine engines typically include a turbo fan, an ignition section and a turbine section. The turbine section drives the turbo fan, and also generates power for supplemental uses. One common use of such an engine is in jet aircraft.

The gas turbine engine is a very complicated piece of machinery involving a number of assemblies, components, etc. Many of these components must be provided with oil for lubricating and/or cooling purposes. Of course, this oil can become quite hot, and thus cooling the oil becomes necessary.

In known gas turbine engines, the oil is routed through a heat exchanger which is placed in the path of airflow driven by the turbo fan. While the gas turbine engine is operating, the turbo fan is driven, and air is driven through the heat exchanger for the oil cooler. However, at times during operation of the gas turbine engine the turbo fan is not being driven at a high rate and thus there is a lesser airflow over the heat exchanger. This can occur, for example, when an aircraft has just been shut down, is sitting on the runway for a period of time, at engine start-up, or other points of lower power to the turbo fan.

SUMMARY OF THE INVENTION

In the disclosed embodiment of this invention, a supplemental airflow is passed over an oil cooler heat exchanger when the turbo fan is at a low airflow condition.

In one embodiment, the supplemental airflow is taken from a tap to ambient air, and selectively driven by a supplemental airflow fan over the heat exchanger when the additional airflow is necessary. The supplemental airflow fan may be provided with a control such that the fan is actuated when conditions are indicative of the turbo fan being at a lower flow condition. A worker of ordinary skill in the art would recognize what conditions might reduce the airflow from the turbo fan over the heat exchanger, and thus indicate that the supplemental airflow fan should be actuated.

In the disclosed embodiment, a valve allows or blocks flow of the supplemental airflow over the heat exchanger. The valve may be a valve that will simply open at reduced airflow conditions, or could also be provided with some powered mechanism such that it is driven to open by the control that actuates the supplemental airflow fan.

The present invention thus provides supplemental airflow for cooling of the heat exchanger at times when the turbo fan is at a lower speed.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
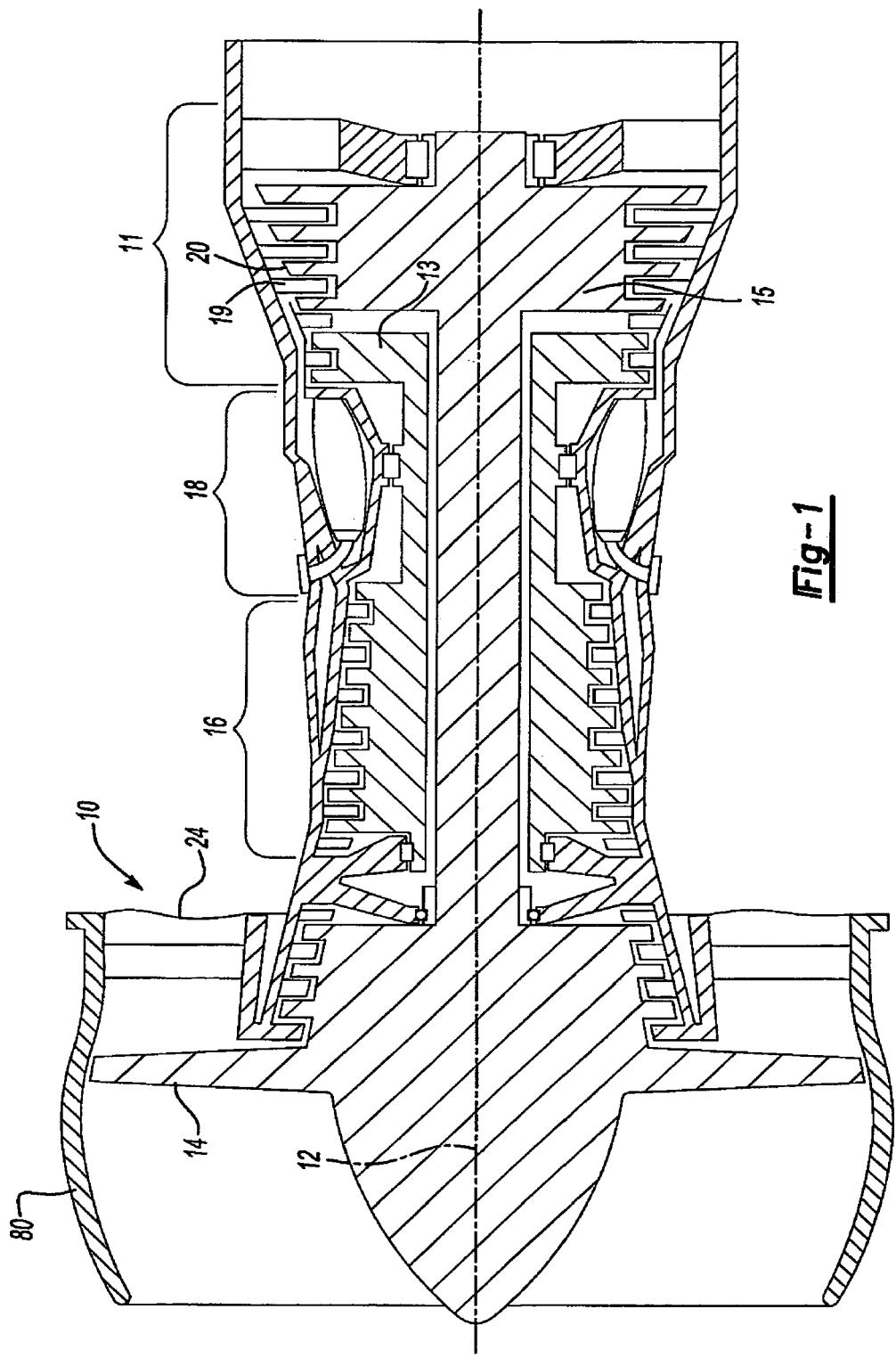
FIG. 1 is a schematic view of a gas turbine engine.

FIG. 1 shows a gas turbine engine 10, such as a gas turbine used for power generation or propulsion, circumferentially disposed about an engine centerline, or axial centerline axis 12. The engine 10 includes a turbo fan 14, a compressor 16, a combustion section 18 and a turbine 11. As is well known in the art, air compressed in the compressor 16 is mixed with fuel that is burned in the combustion section 18 and expanded in turbine 11. The air compressed in the compressor and the fuel mixture expanded in the turbine 11 can both be referred to as a hot gas stream flow. The turbine 11 includes rotors 13 and 15 that, in response to the expansion, rotate, driving the compressor 16 and turbo fan 14. The turbine 11 comprises alternating rows of rotary blades 20 and static airfoils or vanes 19. FIG. 1 is a somewhat schematic representation, for illustrative purposes only, and is not a limitation on the instant invention that may be employed on gas turbines used for electrical power generation, aircraft, etc.

Figure 2:
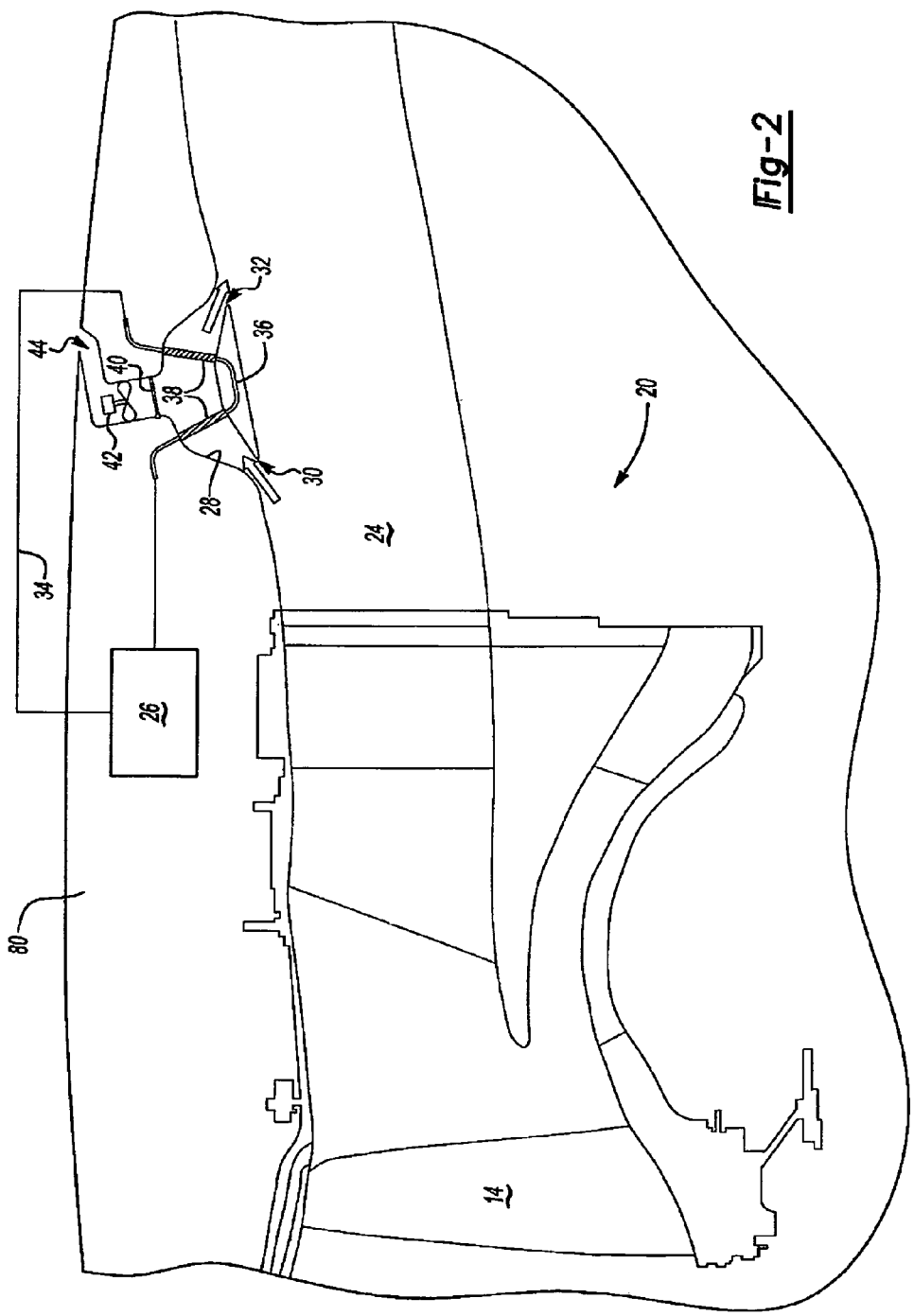
FIG. 2 shows a portion of the gas turbine engine including an oil cooler feature.

FIG. 2 shows the detail of an oil cooler. As shown, the turbo fan 14, drives air through a main airflow path, or air passage. 24. Air flowing through the main airflow path 24 performs several functions. One function is to cool oil that has been utilized to lubricate and/or cool various components, such as shown schematically at 26, associated with the gas turbine engine 10. As shown, a duct 28 includes an inlet 30 that receives airflow from the turbo fan 14, and passes through duct 28 to an exit 32, at which the cooling airflow rejoins the main airflow path 24. An oil line 34 that communicates with the components 26 also passes within the duct 28. A portion 36 of a housing for the gas turbine engine 10 receives a portion of oil line 34, and exposed heat exchanger portions 38 of oil line 34 sit in the duct 28, and in the path of airflow from the inlet 30 to the exit 32. As explained above, during normal engine operations, sufficient air passes into the inlet 30 and out the exit 32 to cool the oil in heat exchanger portions 38. However, at times, there may be a lesser airflow. Thus, the present invention includes a supplemental cooling air feature.

A valve 40 is associated with a supplemental airflow fan 42 for tapping air from ambient source 44 and passing the air into duct 28. A control is associated with the supplemental airflow fan 42 for actuating the fan when conditions are indicative of a low airflow situation. The valve 40 may be spring biased, gravity biased to an open position, or under the control of a control, such as a control associated with the supplemental airflow fan 42. As an example, when a large volume of air is passing through duct 28, this may be sufficient to hold the valve 40 closed, however, when there is a lesser airflow the valve 40 may be designed such that it will open. A worker of ordinary skill in the valve air would recognize the various optional functions that different valve arrangements can provide. As can be appreciated from FIGS. 1 and 2, and as would be understood by a worker of ordinary skill in the art, the main airflow path 24 is radially inward of a nacelle 80. As can be appreciated from FIG. 2. the supplemental air is taken from a location radially outward of the nacelle 80.

Figure 3:
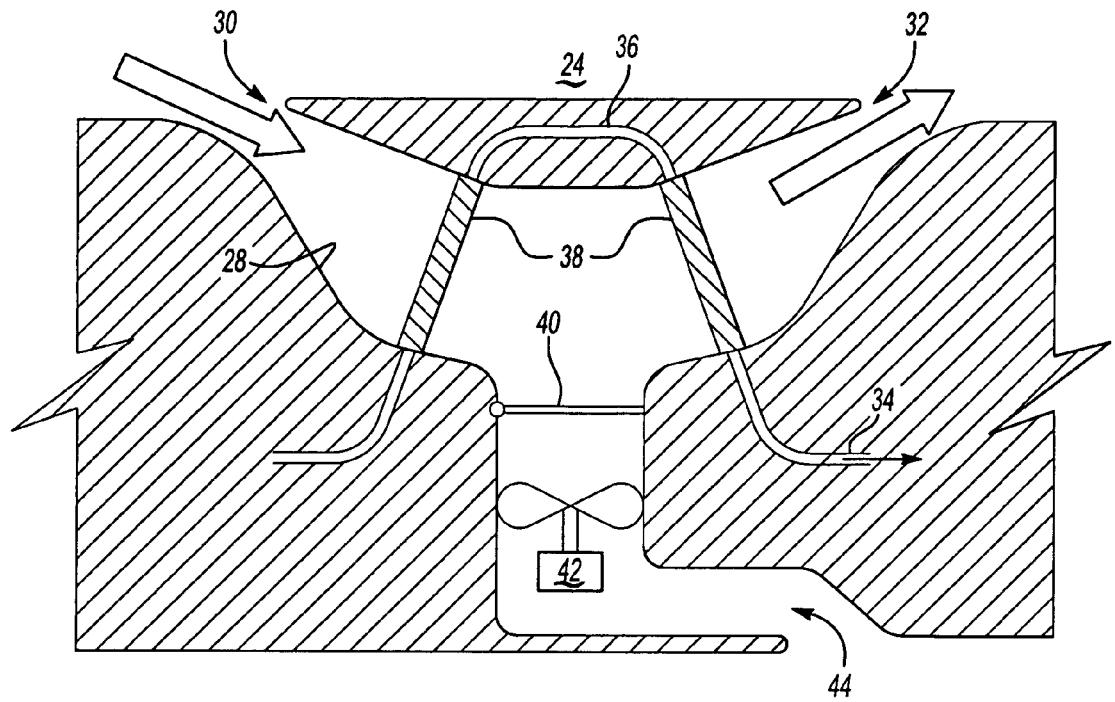
FIG. 3 details a supplemental oil cooler feature in an off position.

The detail of the supplemental oil cooling structure is shown in FIG. 3. In FIG. 3, the valve 40 is shown closed, with air flowing into the inlet 30, and out the outlet 32. As can be seen, valve 40 communicates with a location in duct 28, intermediate heat exchanger portions 38, and intermediate inlet 30 and outlet 32.

Figure 4:
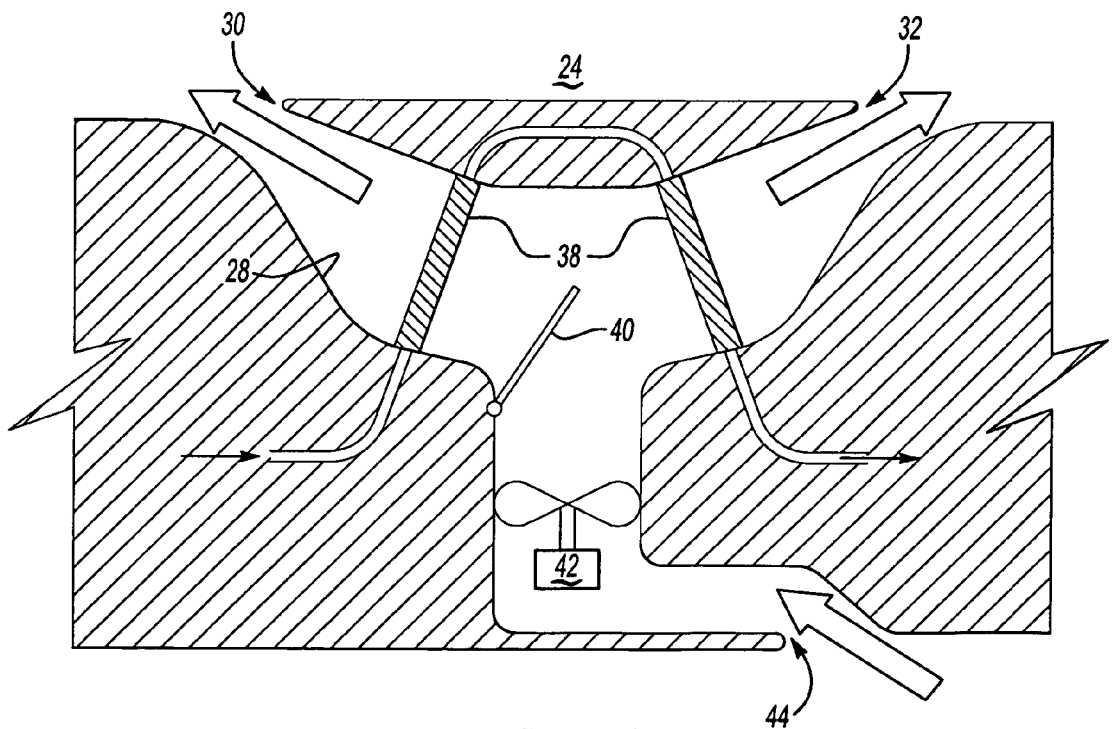
FIG. 4 details the supplemental oil cooler feature in an on position.

FIG. 4 shows the valve 40 having been moved to the open position. As can be seen, air is driven into duct passage 28 and passes in both directions, both out the entrance 30 and out the exit 32, cooling both of the heat exchanger portions 38. In this manner, the present invention addresses any cooling concern that may occur at times of low airflow through the main airflow path 24.

Although a preferred embodiment of this invention has been disclosed, a worker of ordinary skill in the art would recognize that certain modifications will come within the scope of this invention. For that reason the following claims should be studied to determine the true scope and content of this invention.

What is claimed is:

1. A gas turbine engine comprising:
    a turbo fan driven by a turbine section, said turbo fan being driven at a variable speed dependent on operational conditions of the gas turbine engine, an air passage receiving airflow from said turbo fan, and air in said air passage passing over a heat exchanger, said heat exchanger receiving oil, said oil being communicated through said heat exchanger from at least one component associated with the gas turbine engine;
    a supplemental airflow system for selectively supplying supplemental air over said heat exchanger at times when said turbo fan is operating at a relatively lower speed such that the airflow in said air passage is relatively low, the supplemental air coming from an ambient air source; and
    a nacelle surrounds said turbo fan, with said air passage being radially inward of said nacelle, and said supplemental air being taken from a location radially outward of said nacelle.

2. The gas turbine engine as set forth in claim 1, wherein said supplemental airflow system includes a supplemental fan for driving air over said heat exchanger.

3. The gas turbine engine as set forth in claim 1, further including a cooling duct, said cooling duct having an inlet for receiving air from said air passage and directing the air through said heat exchanger, and an outlet for directing the air from said heat exchanger and discharging the air into the air passage.

4. The gas turbine engine as set forth in claim 3, wherein said supplemental air flows into said cooling duct, and flows over at least a pair of spaced heat exchangers into said air passage through both said inlet and said outlet when supplemental airflow need is indicated.

5. The gas turbine engine as set forth in claim 4, wherein said supplemental air flows into said duct intermediate said pair of spaced heat exchangers.

6. A gas turbine engine comprising:
    a turbo fan driven by a turbine section, said turbo fan being driven at a variable speed dependent on operational conditions of the gas turbine engine, an air passage receiving airflow from said turbo fan, and air in said air passage passing over a heat exchanger, said heat exchanger receiving oil, said oil being communicated through said heat exchanger from at least one component associated with the gas turbine engine;
    a supplemental airflow system for selectively supplying supplemental air over said heat exchanger at times when said turbo fan is operating at a relatively lower speed such that the airflow in said air passage is relatively low;
    said supplemental airflow system including a supplemental fan for driving air over said heat exchanger; and
    said supplemental fan being provided with a control that selectively actuates said supplemental fan when conditions are indicative of a need for additional airflow over said heat exchanger.

7. The gas turbine engine as set forth in claim 6, wherein a valve selectively blocks communication between said supplemental fan and said heat exchanger under conditions where said supplemental airflow need is not indicated.

8. The gas turbine engine as set forth in claim 7, wherein said supplemental fan is placed between said valve and a supplementary air source.

9. An oil system for a gas turbine engine comprising:
    an oil supply line communicating lubricant to a component on a gas turbine engine, said oil supply line communicating to a heat exchanger, said heat exchanger being located in the path of air driven by a turbo fan associated with the gas turbine engine;
    a supplemental airflow system for selectively supplying supplemental air over said heat exchanger at times when the turbo fan is operating at a relatively lower speed condition such that the turbofan generated airflow over said heat exchanger is relatively low, the supplemental air coming from an ambient air source and
    the supplement airflow system takes in supplemental air from a location radially outward of a nacelle for the gas turbine engine.

10. The oil system as set forth in claim 9, wherein said supplemental airflow system includes a supplemental fan for driving air over said heat exchanger.

11. The oil system as set forth in claim 9, further including a cooling duct, said cooling duct having an inlet for receiving air from an air passage that will receive air from the turbo fan and directing the air through said heat exchanger, and an outlet for directing the air from said heat exchanger and discharging the air into the air passage.

12. The oil system as set forth in claim 11, wherein said supplemental air flows into said cooling duct, and flows over at least a pair of spaced heat exchangers and into said air passage through both said inlet and said outlet when supplemental airflow need is indicated.

13. The oil system as set forth in claim 12, wherein said supplemental air flows into said duct intermediate said pair of spaced heat exchangers.

14. An oil system for a gas turbine engine comprising:
    an oil supply line communicating lubricant to a component on a gas turbine engine, said oil supply line communicating to a heat exchanger, said heat exchanger being located in the path of air driven by a turbo fan associated with the gas turbine engine;
    a supplemental airflow system for selectively supplying supplemental air over said heat exchanger at times when the turbo fan is operating at a relatively lower speed condition such that the turbofan generated airflow over said heat exchanger is relatively low;
    said supplemental airflow system including a supplemental fan for driving air over said heat exchanger; and
    supplemental fan being provided with a control that selectively actuates said supplemental fan when conditions are indicative of a need for supplemental airflow over said heat exchanger.

15. The oil system as set forth in claim 14, wherein a valve selectively blocks communication from said supplemental fan over said heat exchanger under conditions where said supplemental airflow is not indicated.

16. The oil system as set forth in claim 15, wherein said supplemental fan is placed between said valve and a supplemental air source.

* * * * *